Jan. 22, 1963  
J. E. STARR  
3,075,160  
LOAD MEASURING DEVICES  
Filed Dec. 1, 1960

INVENTOR.
BY James E. Starr 3,075,160
LOAD MEASURING DEVICES
James E. Starr, Cumberland, Md., assignor to The Budd Company, Philadelphia, Pa., a corporation of Pennsylvania
Filed Dec. 1, 1960, Ser. No. 72,990
1 Claim. (Cl. 338—5)

This invention relates to load measuring devices and more particularly to load cell spring elements exhibiting a surface strain relatable to the magnitude of an applied load.

It has been axiomatic to increase spring element deflection in order to increase gauged-strain levels as a means for increasing load cell output. However, the linearity of load cell response varies, inversely, as the spring element deflection range is increased for a given load.

The relationship between a load P, applied vertically at the free end of a horizontal cantilever beam, to the maximum gauged-surface strain $e$, is given by: $e/P \propto c/I$, where $I$ is the moment of inertia of the beam and $c$ the distance between gauged and neutral surfaces. Therefore, conventional approach to increasing gauged-strain levels for a given load has been to decrease $I$. Further, it is desirable to maintain rectangular cross-sections so that the moments of inertia have been reduced by either thinning or narrowing the beam elements. The former change, however, is less effective for increasing the strain ratio because $c$ is also decreased thereby.

It is also well known that cantilever beam deflection, $D$, relative to a load, $P$, varies according to: $D/P \propto L/I$, where $L$ is the distance between support and point of load application. It follows that any decrease in the moment of inertia $I$, accomplished by reducing the rectangular dimensions of a beam, will be accompanied by an increase in the deflection ratio at least as great as the increase in the strain ratio. As a consequence, prior load measuring devices exhibit increased gauge-output non-linearities whenever high strain-load ratios and attendant high deflection-load ratios are employed.

An additional problem hampering attainment of increased load cell output is that the transmission of increased gauged-strain levels to bonded strain gauges requires high shear stress levels to be maintained by a bonding medium. This accelerates creep and zero-shift due to yielding of the bonding medium in shear. The shear stresses in the bonding medium are related to the total strain of the gauged length of the spring element, but vary in magnitude along the gauge length, and are highest at the lateral interconnecting portions or tabs between longitudinal gauge elements. The shear stress concentrations at gauge tabs are not effective to increase gauge output but, instead, limit usable gauge-strain levels below those otherwise employable.

Therefore, it is an object of this invention to provide an improved load measuring device exhibiting improved gauged-strain to deflection ratios.

More specifically, an object of this invention is to provide a load measuring device which yields optimum, linear and stable outputs with minimum spring element deflection and reduced bonding medium shear stress gradients, without sacrifice of the advantages of a rectangular cross-section spring element configuration.

The load measuring device according to this invention comprises a spring element beam which includes, integrally, a supporting portion, a gauging portion, and a loading portion; the moment of inertia at each cross-section of the gauging portion being substantially less than the moment of inertia at each cross-section of the supporting and loading portions. In a further embodiment, a resistance strain gauge is bonded throughout its area to the beam so that substantially all transverse gauge portions at one end of the gauge are bonded to the supporting portion of the beam and those at the other end are bonded to the loading portion of the beam.

The features of this invention believed to be novel are pointed out with particularity in the appended claim. However, for a better understanding together with further objects and advantages thereof, reference should be had to the following description taken in conjunction with the accompanying drawing, wherein:

Figure 1:
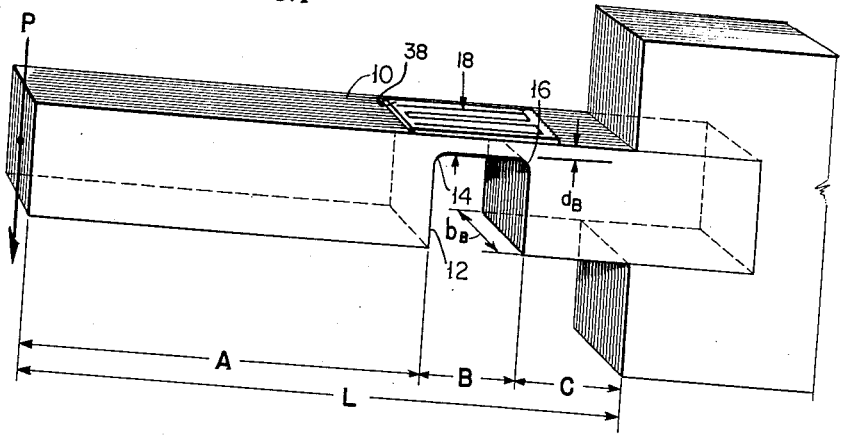
FIG. 1 is a simplified illustration of a load measuring device, beam 10, according to this invention.

With reference to FIG. 1, an improved load cell spring element according to this invention comprises a cantilever beam 10 having rectangular cross-sections, taken normally of the beam length at every point along the beam. The beam comprises, integrally, a loading portion A, a gauging portion B, and a supporting portion C. The section of maximum stress within the gauging portion B is taken as at a distance $g$ from the line of action of the load P applied at the free end of the beam. Assuming each cross-section within gauging portion B to have a width $b_B$ and a depth $d_B$, the following equation for maximum surface strain $e$ is satisfied:

$$e = Mc/I_B E = 6Pg/b_B d_B^2 E = k/b_B d_B^2 \quad (I)$$

The relative magnitudes of $b$ and $d$, beam width and depth respectively, are chosen for gauging portion B to provide for optimum gauge position width, shear and torsional properties of the spring element, and to satisfy other extrinsic requirements.

According to this invention, each cross-section within the loading and supporting portions A and C is given dimensions resulting in moments of inertia $I_A$ and $I_C$ (second moments of the cross-sectional areas with respect to their centroidal axes), each greater than moment of inertia $I_B$ of the gauging portion B. The deflection D of the beam resulting from the load P is then given according to:

$$D = \int_A (Px^2/EI_A)dx + \int_B (Px^2/EI_B)dx + \int_C (Px^2/EI_C)dx = A' + k'/bd^3 + C' \quad (II)$$

where $x$ is measured from the point of application of the load; $A'$, $C'$ and $k'$ are constants independent of the cross-section of the gauging portion.

It is apparent from inspection of Equations I and II above that the ratio $D/P$, may be reduced as desired independently of gauged-strain design-maximum $e$ at the lateral surface of the gauging position B for any given load magnitude and beam length. According to this invention, the contributions of the first and third terms in Equation II to the deflection D are minimized by increasing beam depth in the loading and supporting portions A and C relative to the beam depth within the gauging portion B. In conventional measuring devices where the beam dimensions are constant throughout the beam length, the major contribution to deflection is from loading and supporting portions due to their greater length relative to that of the gauging portion; the latter length preferably does not exceed the sensitive length of the bonded strain gauge.

The preferred configuration according to this invention may be described as a beam having a notch 12 extending throughout the length of each gauging portion. It should be realized, however, that the actual development is of a beam thickened throughout each portion thereof other than the gauging portion. Therefore, contributions to deflection D due to bending of the loading and supporting portions can be made negligible by increasing the depth $d$ of the beam throughout these portions; that is, constants A' and C' in Equation II can be given negligible values.

The beam bending is substantially confined to the gauging portion and total deflection therefore approaches the theoretical minimum for any given gauged strain design-maximum.

While the explanation above has tacitly assumed a notch 12 of uniform depth, it is important in application that excessive stress concentrations be avoided in the regions of the internal corners of the notch. This is achieved by providing fillets 14 and 16 at each interior notch corner. In the preferred configuration, the fillets have sufficiently large radii of curvature so that the surface strain at the gauging surface is substantially unaffected by corner stress concentrations. It is, of course, impractical to eliminate such effects completely. Therefore, it will be convenient hereinafter to define the effective length of the notch as equal to the gauged-surface length between positions where surface strain levels are reduced substantially to the surface strain levels given by the relationship of Equation I above as applied to the loading and supporting portions A and C. This effective notch length will exceed an actual notch length, scaled from a beam 10 as in FIG. 1, by, at most, a small fraction of the minimum beam depth.

Figure 2:
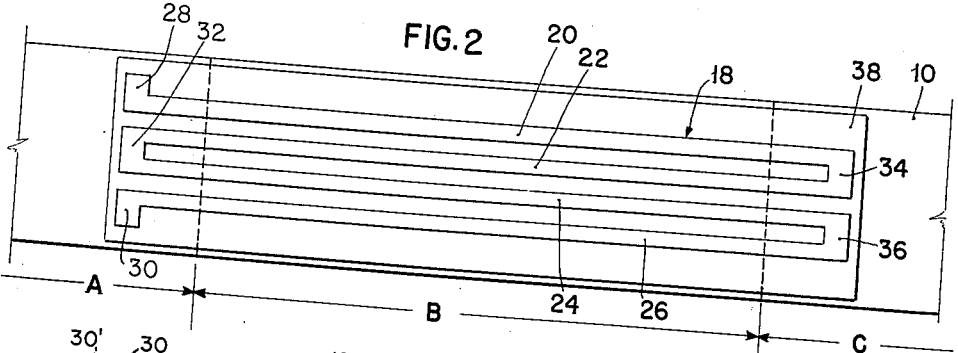
FIG. 2 is an enlarged top view of the intermediate portions of beam 10 of FIG. 1 and illustrates location of a bonded resistance strain gauge 18 thereon according to this invention.

FIG. 2 is an enlarged top view of the intermediate section of the beam 10 of FIG. 1 illustrating the preferred orientation of bonded resistance strain gauge 18 over the notch 12 of the gauging portion B. Such a gauge comprises a plurality of strain sensitive filaments 20, 22, 24, 26 oriented parallel with the longitudinal axis of the beam 10. The filaments are connected in series between end lead interconnection areas 28 and 30 by transverse filament interconnection areas 32, 34, 36 formed as integral extensions of the filament material. The gauge 18 is integrally attached to the beam 10 by means of an adhesive bonding layer 38. Gauge strain is the result of shear stress load transmission through the adhesive bonding layer 38.

Creep and zero shift gauge output errors are due, primarily, to yielding of the bonding medium in shear. However, experimental stress analysis has proved that nearly the entire gauge load is transmitted by shear stress concentrations at the ends of the gauge filaments. Conventional spring element configurations aggravate these shear stress concentrations by presenting gauged surface strain gradients in the areas subtended by the ends of the gauge filaments. According to this invention, strain gradients over the spring element surface areas subtended by the filaments 20, 22, 24, 26 are practically eliminated. The strain gauge 18 is given a sensitive gauge length, defined by filaments 20, 22, 24, 26 substantially greater than the length of the spring element gauging portion B, defined as the effective length of notch 12. The gauge 18 is oriented with the remainder of its total length outside of the gauging portion, that is, with one set of interconnection areas 28, 30, 32, entirely within the loading portion A and the other set of interconnection areas 34, 36 entirely within the supporting portion C.

Figure 3:
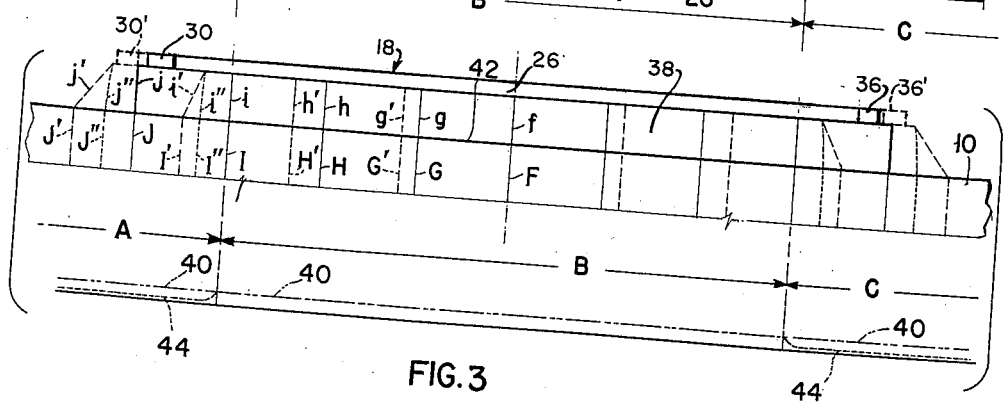
FIG. 3 is a schematic diagram illustrating shear stress gradients imposed upon the strain gauge bonding medium as related to strains developed at the gauged surface.

The representation of FIG. 3 depicts a portion of the load cell device of FIGS. 1 and 2—a section of beam 10, bonding layer 38, and strain gauge 18—exaggerated in thickness.

The heavy solid outlines indicate the initial, unstrained, condition of the elements of strain gauge 18 (e.g. filament 26, end tab 30, and interconnecting portion 36), the bonding medium layer 38, and the adjacent portion of beam 10. The solid vertical lines within the representations of the bonding layer and beam show initial positions (before application of a load) of equally spaced cross-section planes F, G, H, I, and J in the beam and similarly spaced cross-section planes $f, g, h, i,$ and $j$ in the bonding layer. The dashed lines (primed symbols) show positions of those cross-section planes after a load P has been applied to deflect beam 10 and put its upper surface (interface 42) in tension. Simultaneously, the gauge filament 18 is extended, and tab 30 moves to 30' and interconnecting portion 36 moves to 36'.

Extension of interface 42 is transmitted by shear stresses in layer 38 to strain gauge 18. The gauge 18 is loaded by those shear stresses and acts as a restraint on the free extension of layer 38. During loading, therefore, each of the bonding medium planes ($f, g, h, i,$ and $j$) becomes canted by an amount indicative of the shear stress magnitude at its respective location.

The shear stress concentration magnitudes of the gauge ends depend upon two factors: (1) total strain along the length of filament 26; and (2) the unit strain at the surface portions of the beam subtended by the gauge ends.

In the schematic representation, the shear stresses developed in the vicinity of a gauge end portion 30 is indicated by the cant of planes $i'$ and $j'$. If these planes had only to assume the less canted positions $i''$ and $j''$, the shear stress concentrations would be reduced. The latter condition is accomplished by reducing displacement of corresponding beam cross-sections, as from J only to J'' and from I only to I'', by increasing the bending moments for the beam portions A and C relative to the moment of inertia prescribed for gauging portion B. As a consequence, beam surface unit strains are reduced at the locations where the maximum shear stress concentrations are liable to occur.

According to this aspect of the invention, stress concentrations and attendant difficulties are significantly reduced. This is accomplished with the defined spring element configuration (beam 10) by the combination therewith of a bonded resistance strain gauge (18) having a sensitive length (that of filaments 20, 22, 24, 26) substantially greater than the length of the gauged strain portion (B, defined as the effective length of notch 12), the gauge being positioned with the remainder of its length outside of the gauged strain portion (B), with one set of interconnection areas (28, 30, 32) within the loading portion (A) and the other set (34, 36) within the supporting portion (C). The result is that one of the causes of the shear stress concentrations is reduced, without reduction of the gauged-strain levels, concurrently with reduction of the spring element deflection. Conversely, the gauged-strain design maximum may be increased for a given creep tolerance limitation.

While explanation has been with reference to a cantilever beam, a spring element fixed at one end, it will be apparent that other end conditions may be prescribed for the spring element without departing from this invention. Various other changes and modifications may be made by those skilled in the load cell art and it is, therefore, aimed in the appended claim to cover all such changes and modifications as fall within the true spirit and scope of the invention.

What is claimed is:

A load cell combination comprising:
(A) a flat surfaced spring element beam adapted to be bent normally of the flat surface in response to loads applied at a loading position intersecting that surface,
(B) support means fixing one end of the beam against deflection,
(C) the beam being shaped to define integrally along its length
(i) an intermediate gauging portion of a first thickness,
(ii) a supporting portion of greater thickness than the gauging portion extending between the support means and the gauging portion,
(iii) a loading portion of greater thickness than the gauging portion extending between the loading position and the gauging portion, (iv) the respective cross-sectional areas and moment of inertia for bending of the loading nad supporting portions being greater than the cross-sectional area and moment of inertia for bending of the gauging portion, and (D) a resistance strain gauge adhesively bonded to the flat surface of the beam, strained therewith in accordance with the magnitude of the applied loads, and comprising (i) a plurality of parallel strain sensitive filaments each substantially longer than the gauging portion and (ii) a plurality of transverse filament interconnecting portions at opposite ends of the filaments, (iii) the connecting portions at opposite ends of the filaments being respectively oriented within and bonded to the loading and supporting portions of the beam.

References Cited in the file of this patent

UNITED STATES PATENTS

| | | |
|---|---|---|
| 2,722,587 | Buzzeth et al. | Nov. 1, 1955 |
| 2,775,887 | Hines | Jan. 1, 1957 |